United States Patent [19]
Kling

[11] Patent Number: 5,083,451
[45] Date of Patent: Jan. 28, 1992

[54] METHOD AND APPARATUS FOR MONITORING AIRCRAFT FUSELAGE DETERIORATION

[75] Inventor: Harry P. Kling, Glen Arm, Md.

[73] Assignee: J. V. - 1, Ltd., Towson, Md.

[21] Appl. No.: 597,357

[22] Filed: Oct. 10, 1990

Related U.S. Application Data

[63] Continuation-in-part of Ser. No. 396,376, Aug. 21, 1989, abandoned.

[51] Int. Cl.$^5$ ............................................. G01M 3/26
[52] U.S. Cl. ........................................ 73/49.2; 73/40; 340/605
[58] Field of Search ................ 73/49.2, 40, 49.3, 52; 340/605, 606, 611

[56] References Cited

U.S. PATENT DOCUMENTS 3,893,332 7/1975 Dolan et al. ................ 73/49.2 X
3,918,291 11/1975 Pauly et al. ................ 73/49.2 X
4,078,421 3/1978 Gastaldo et al. ................ 73/49.2
4,118,780 10/1978 Hirano ................ 73/40 X
4,510,791 4/1985 Yuill ................ 73/40

Primary Examiner—Hezron E. Williams
Assistant Examiner—Joseph W. Roskos
Attorney, Agent, or Firm—Peter L. Klempay

[57] ABSTRACT

In a pressurized aircraft, the net air leakage occurring while the aircraft is pressurized at altitude, i.e., the difference between the mass flow rate of all air supplied to the pressurized compartments of the aircraft and the mass flow rate of all air intentionally discharged to the external ambient, is calculated by a system employing air mass flow gauges in the air supply and discharge ducts. Increases in the rate of leakage over time furnish an indication of deterioration of the aircraft structure such as that caused by fatigue and stress corrosion of the external skin.

19 Claims, 1 Drawing Sheet

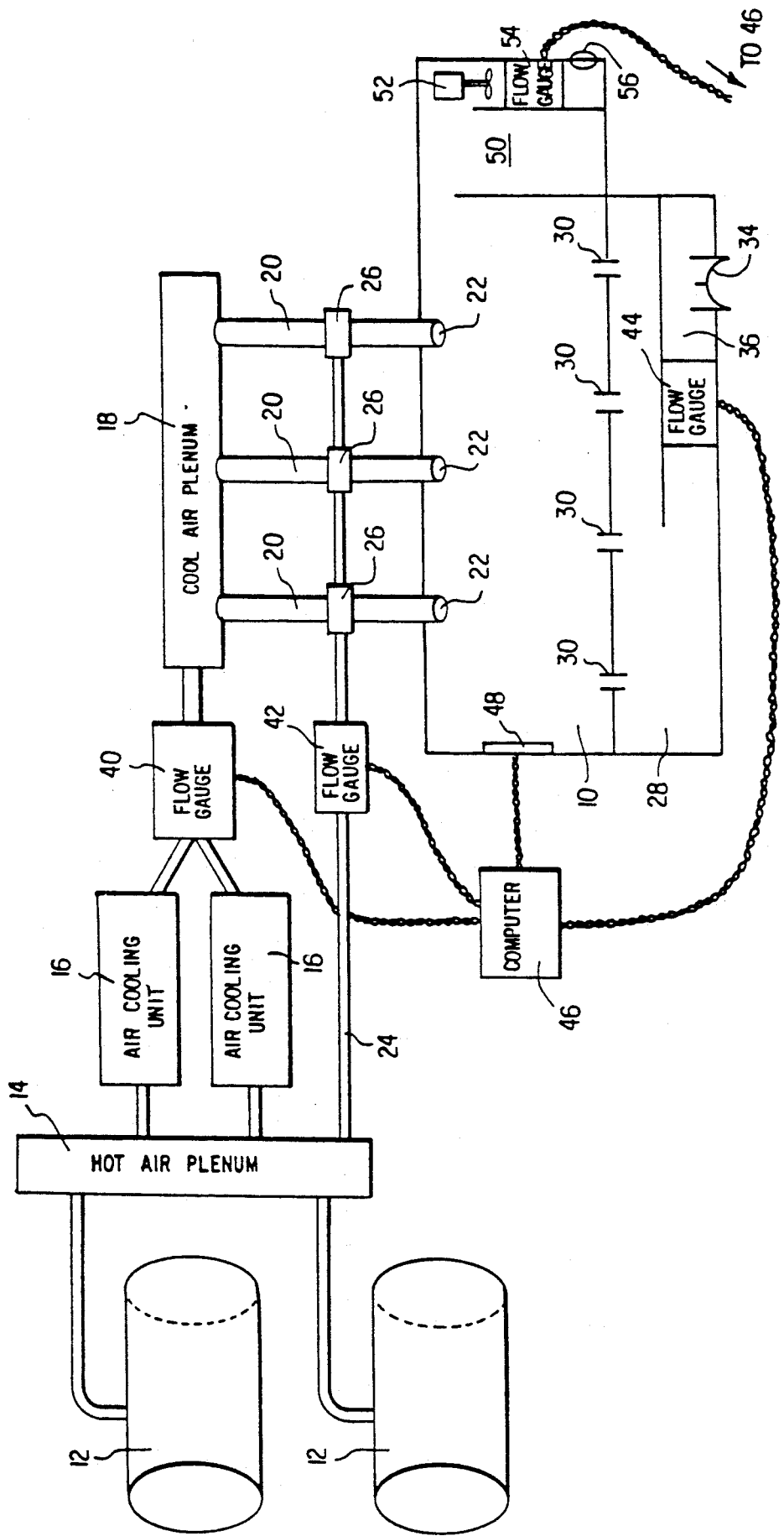

METHOD AND APPARATUS FOR MONITORING AIRCRAFT FUSELAGE DETERIORATION

CROSS-REFERENCE TO RELATED APPLICATIONS

This application is a continuation-in-part of my U.S. application Ser. No. 07/396,376; filed on Aug. 21, 1989; for METHOD AND APPARATUS FOR MONITORING AIRCRAFT PRESSURIZATION now abandoned.

BACKGROUND OF THE INVENTION

The present invention pertains to pressurized aircraft fuselages and, more particularly, a method for monitoring of such fuselages to detect deterioration of the pressurized compartments of the aircraft by measuring leakage of the pressurizing air therefrom and to apparatus for effecting the method.

Recent aircraft accidents involving catastrophic failure of portions of the aircraft fuselage have focused attention on the need for monitoring systems for detecting component deterioration and/or improper operation of the closure systems which may lead to such failures. The aircraft fuselage consists of a grid of bulkheads and stringers fabricated of aluminum alloy and a covering of alclad sheet rivetted to the bulkheads and stringers and forming the aerodynamic surface of the plane. While alclad sheet is formulated to be highly resistant to corrosion, consisting of high strength aluminum alloy, clad (usually on both surfaces) with a slightly different alloy, usually commercially pure aluminum, chosen for high resistance to corrosion, localized corrosion does occur over time, particularly at rivetted joints. As such corrosion is predominately in the high strength alloy rather than the cladding, it is not readily detectable until significant deterioration has occurred.

Aircraft having pressurization systems, which constitute the majority of aircraft in commercial operation, are particularly susceptable to such accidents. This is a consequence of the repeated cycles of stress imposed on the aircraft structure by the pressurization and depressurization sequence which occurs on each flight of the aircraft. The resultant cyclic loading of the fuselage structure, together with corrosion, causes gradual degradation of the fuselage. This synergistic effect of corrosion and cyclic stress is well recognized in the industry. These effects result in the gradual development of looseness around the rivets and cracking between rivets.

SUMMARY OF THE INVENTION

The present invention provides for quantifying the degradation of the aircraft fuselage by measurement of the quantity of cabin air that leaks from the cabin under the pressure differential that is generated at altitude.

The present invention provides for the monitoring, preferably on a continuous basis, of the integrity of the pressurized fuselage. More specifically, the invention involves the monitoring of the mass flow rate of all air admitted into the pressurized compartments of the aircraft and the mass flow rate of all air intentionally discharged from the compartments to thereby determine the air leakage rate, i.e. the difference between the two air mass flow measurements. The calculations are performed by an onboard computor which can be used to develop a history of the pressurization characteristics of the aircraft.

Monitoring of the leakage rate provides a method for detecting aircraft skin deterioration such as described above as such corrosion and fatigue results in detectable increases in the rate of leakage of air from the craft when under pressurization. The monitoring system of the present invention provides an indication of the need for remedial action when the leakage rate exceeds a predetermined value.

In addition, the monitoring system can provide an immediate indication and alarm in the event of a gross increase in the leakage rate such as that resulting from a localized tear in the fuselage skin, An alarm can also be obtained before takeoff by slightly overpresurizing the aircraft and noting the leakage rate to thereby detect an inproperly closed door or the like. If used in this mode, the system can avoid the hazzards and disruptions attendant upon an aborted takeoff and climb out.

For a more complete understanding of the invention and the objects and advantages thereof, reference should be had to the accompanying drawing and the following detailed description wherein a preferred embodiment of the invention is illustrated and described.

DESCRIPTION OF THE DRAWING

The sole figure is a schematic showing of an aircraft pressurization system equipped with the monitoring system of the present invention.

DESCRIPTION OF THE PREFERRED EMBODIMENT

With the exception of the monitoring system of the present invention, to be described below, the aircraft pressurization system illustrated is conventional and functions to maintain the pressure within the aircraft cabin 10 at a level consistent with human safety and comfort during high altitude flights. In such a system, compressed air is bled from one or more compressor stages of the aircraft engines 12 to a hot air plenum 14 which may also serve as a source of pneumatic power for several auxiliary devices. A portion of the air from plenum 14 is passed through air cooling units 16, typically air-to-air heat exchangers cooled by the outside air, to a cool air plenum 18 connected by ducts 20 to air distribution nozzles 22 opening into the cabin space of the aircraft. To provide temperature control in the cabin space, additional hot air from plenum 14 is supplied through duct 24 to remotely controlled mixing valves 26 located in the cabin supply ducts 20 where this trim air is mixed with the cool air to achieve the desired temperature level. From the cabin 10, air flows to the cargo bay 28 through vents 30. An outflow valve 34 discharges air from the cargo bay to the external ambient, the outflow valve being an automatically controlled valve programmed by the flight crew to maintain the desired cabin pressure.

If the aircraft cabin were of perfectly airtight construction, the total mass flow of air admitted into the cabin and cargo bay from the cool air plenum 18 and the trim air duct 24 would equal the total mass flow of air discharged to the external ambient through the outflow valve 34 under conditions of constant pressure level within the cabin. However, even newly constructed aircraft exhibit some leakage of air from the pressurized areas and, as the aircraft ages, this leakage rate increases, as described above.

The present invention provides for the monitoring of the air flow into the pressurized regions of the aircraft by means of the internal pressurization system and of the air flow intentionally discharged therefrom while the aircraft is pressurized at altitude to thereby determine the leakage rate. To this end, a first air mass flow gauge 40 is interposed between the air cooling units 16 and cool air plenum 18 to measure of mass flow of cool air and a second air mass flow gauge 42 is located in the trim air duct 24 upstream of the mixing valves 26 for measuring the mass flow of hot air. A third air mass flow gauge 44 measures the mass flow of air discharged to the external ambient through outflow valve 34, a duct 36 being provided to assure that all air flow to the overflow valve is passed through the air mass flow gauge 44.

An onboard computer 46 receives the signals from each of the air mass flow gauges to calculate the amount of air leakage, that is, the difference between the total air flow admitted to the pressurized regions as measured by the gauges 40 and 42 and the intentionally discharged air flow as measured by the gauge 44. The leakage air flow is, preferably, expressed as a leakage rate. The computer may also maintain a record of the leakage rate, for example, that detected at specific time intervals, or the maximum rate detected during each pressurization cycle, or the rate as a function of altitude, or as any convenient function, thus generating a history of the leakage rate for the aircraft. Additionally, the leakage rate may be compared to an empirically determined leakage rate which represents the upper limit of acceptable leakage and if this limit is exceeded an indication of the need for remedial action is given. The output of the computer, in appropriate format, is displayed to the flight crew by instrumentation 48.

There have been incidents in which small local tears have occurred in the aircraft skin without the flight crew recognizing the mishap until the plane has landed. As such an event would result in an abrupt change in the leakage rate, the computer can be programmed to recognize such an event and alert the flight crew thereof.

In addition, the computer may be programmed to detect any sudden increase in the leakage rate above that previously recorded and to furnish an immediate indication or alarm in response thereto. A primary cause of a sudden increase in the leakage rate is the improper latching and sealing of doors and hatches. If the aircraft is intentionally slightly overpressurized after all doors and hatches have been closed and sealed for takeoff and prior to the takeoff, such a sudden increase in the leakage rate provides an immediate indication of the faulty closure. Accordingly, the monitoring system alarm is generated at a point in time at which corrective action can be taken immediately.

In some aircraft, certain areas such as galleys and lavatories 50 are separately vented to avoid circulation of odors from these areas into the cabin of the craft. If such areas are vented into the cargo bay 28, the air vented therefrom is also discharged through the gauge 44 and outflow valve 34 and no alteration of the venting arrangement is required. When these areas are separately vented to the exterior ambient, however, an additional air mass flow gauge 54 is provided at each of the additional vents with the measurements from these gauges being added to that detected by the outflow gauge 44 to provide measurement of the total intentionally vented air flow. Such galleys and lavatories may be provided with a fan 52 to provide air flow while the aircraft is on the ground and a differential pressure valve 56 to provide air flow at altitude.

Air leakage paths other than those occurring at rivets due to corrosion and stressing are often present, principally involving leakage at door and hatch gaskets. Information on the leakage rates through such paths is supplied to the computer to permit determination of the acceptable leakage rate limit. For example, the rate of air leakage at a door may periodically be measured, as at routine maintenance intervals and an appropriate correction inputted into the computer. This reading may also be used as a guide for the replacement of door and hatch gaskets. After maintenance operations which may effect the aircraft leakage rate, such as cleaning and painting of the exterior of the aircraft, it may be desirable to input a new reference leakage rate into the computer.

The aircraft fuselage monitoring system and method which have been described above offer a number of advantages over the inspection and testing procedures which have heretofor been employed. The measurement of the rate at which air leaks from the pressurised compartments of the aircraft at altitude is, effectively, measurement of the porosity of the fuselage. The degree of porosity of the fuselage is directly related to the integrity thereof and, accordingly, the present invention provides a more direct measurement of the integrity of the fuselage than do testing procedures such as ultrasonic or electrical resistance testing, which are measurements of secondary properties from which the structural integrity must be deduced.

The measurement of air leakage from the pressurized fuselage is a test of the integrity of the entire fuselage in one operation, in contrast to prior art procedures in which only selected elements or portions of the structure are inspected. As the measurements are automatically performed throughout each interval during which the aircraft is pressurized at altitude, the present invention provides a continual inspection of the fuselage integrity which is not feasible with other inspection procedures.

The history of the leakage characteristics of the aircraft that is developed is a valuable aid in scheduling other inspections and maintenance procedures. The unique record of the rate of loss of air through the fuselage that is generated for each aircraft equipped with the system of the present invention provides a basis for determining the scheduling of further inspections and of maintenance procedures for that specific aircraft. Thus inspections and maintenance may be planned in accordance with the known condition of each aircraft rather than at arbitrarily determined intervals.

It will be understood that, while a preferred embodiment of the invention has been illustrated and described in detail herein, changes and additions may be had therein and thereto without departing from the spirit of the invention. Reference should, accordingly, be had to the appended claims in determining the true scope of the invention.

I claim:

1. A method of measuring the deterioration and movement toward ultimate failure with age of the fuselage of an aircraft of the type having an internal pressurization system which comprises:

monitoring the rate at which air leaks out of the fuselage while the fuselage is pressurized by said pressurization system at altitude due to corrosion and fatigue induced porosity of the fuselage.

2. A method of detecting deterioration of the fuselage of an aircraft of the type having at least one pressurized compartment and a pressurization system including a source for supplying pressurized air to the compartment and means for controllably discharging air from the compartment to the ambient which method comprises the steps of:
   determining the rate of leakage of air from the compartment through the fuselage while the compartment is pressurized at altitude; and
   comparing the rate of leakage determined during a pressurization cycle with the rate of leakage determined during previous pressurization cycles to thereby detect a leakage rate increase indicative of increasing fuselage deterioration.

3. The method according to claim 2 wherein the rate of leakage is determined by measuring the mass flow rate of air supplied by the source in pressurizing the compartment, measuring the mass flow rate of air discharged from the compartment through the controllable means during the same time interval, and calculating the difference between the two measured mass flow rates.

4. The method according to claim 3 wherein the aircraft includes openings into the compartment which constitute additional paths of air leakage while the compartment is pressurized at altitude and wherein the determined rate of leakage is compensated by a factor representative of the air leakage through the additional paths.

5. The method according to claim 4 wherein the compensation factor is updated upon performance of aircraft maintenance operations having an effect on the rate of air leakage through the additional paths.

6. The method according to claim 5 further including the step of recording the determined rate of leakage during each pressurization cycle to develop, over time, a history of the leakage rate for the aircraft.

7. The method according to claim 2 wherein the aircraft includes openings into the compartment which constitute additional paths of air leakage while the compartment is pressurized at altitude and wherein the determined rate of leakage is compensated by a factor representatiuve of the air leakage through the additional paths.

8. The method according to claim 7 wherein the compensation factor is updated upon performance of aircraft maintenance operations having an effect on the rate of air leakage through the additional paths.

9. The method according to claim 8 further including the step of recording the determined rate of leakage during each pressurization cycle to develop, over time, a history of the leakage rate for the aircraft.

10. The method according to claim 2 further including the step of recording the determined rate of leakage during each pressurization cycle to develop, over time, a history of the leakage rate for the aircraft.

11. A system for detecting deterioration of the fuselage of an aircraft having at least one pressurizable compartment and a pressurization system including a source for supplying pressurized air to the compartment and means for controllably discharging air from the compartment to the ambient comprising:
   means for measuring the rate of leakage of pressurized air from the compartment through the fuselage while the compartment is pressurized at altitude; and
   means for calculating, from the measured rate of leakage during a pressurization cycle and the measured rate of leakage during previous pressurization cycles, the change of the leakage rate to detect an increase therein indicative of increased deterioration of the fuselage.

12. The system of claim 11 further including means for recording, during each pressurization cycle, the determined rate of leakage during that cycle to develop, over time, a history of the leakage rate for the aircraft.

13. The system of claim 12 wherein said means for measuring includes first air mass flow gauging means for measuring the mass flow rate of air supplied to the compartment from the source, second air mass flow gauging means for measuring the mass flow rate of air controllably discharged from the compartment, and means for computing the difference in the mass flow of air measured by the first and second gauging means.

14. The system of claim 13 wherein the compartment has at least one closeable opening to the external ambient and wherein said means for computing compensates for leakage at the opening in determining the change of the leakage rate.

15. The system of claim 11 wherein said means for measuring includes first air mass flow gauging means for measuring the mass flow rate of air supplied to the compartment from the source, second air mass flow gauging means for measuring the mass flow rate of air controllably discharged from the compartment, and means for computing the difference in the mass flow rates of air measured by the first and second gauging means.

16. The system of claim 15 wherein the compartment has at least one closeable opening to the external ambient and wherein said means for computing compensates for leakage at the opening in determining the change of the leakage rate.

17. The system of claim 11 wherein the compartment has at least one closeable opening to the external ambient and wherein said means for computing compensates for leakage at the opening in determining the change of the leakage rate.

18. A method of detecting the status of the closures of the pressurized compartment of an aircraft of the type having an internal pressurization system comprising the steps of:
   pressurizing the compartment via said pressurization system while the aircraft is on the ground to a level above the ambient;
   measuring the rate of leakage of air from the compartment while so pressurized; and
   furnishing an alarm indication in the event the measured rate of leakage exceeds a predetermined value.

19. A system for detecting the status of the closures of the pressurized compartment of an aircraft of the type having an internal pressurization system comprising:
   means for measuring the rate of leakage of air from the compartment during an interval in which the compartment is pressurized via said pressurization system to a level above the ambient while the aircraft is on the ground;
   means for comparing the measured rate of leakage to a predetermined value; and
   alarm means responsive to the means for comparing to furnish an alarm indication in the event the predetermined value is exceeded.

* * * * *